May 14, 1935.  B. A. SWENNES  2,001,166
PROPELLER SHAFT
Filed Nov. 27, 1933
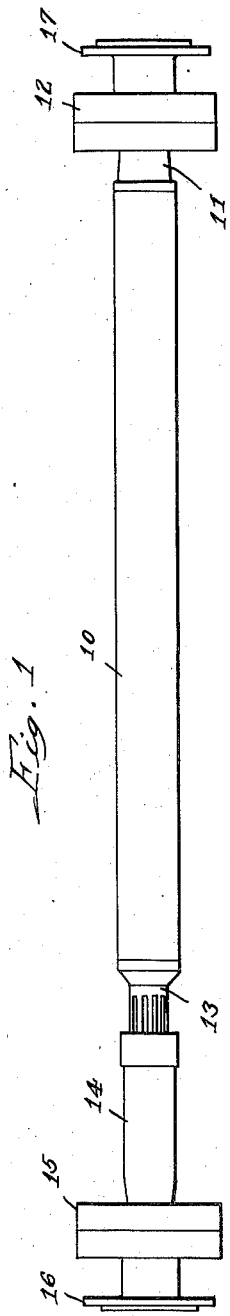
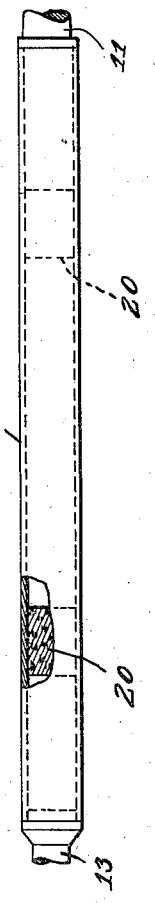

Patented May 14, 1935

2,001,166

UNITED STATES PATENT OFFICE 2,001,166

PROPELLER SHAFT

Benjamin A. Swennes, Rockford, Ill., assignor, by mesne assignments, to Borg-Warner Corporation, Chicago, Ill., a corporation of Illinois Application November 27, 1933, Serial No. 699,855

8 Claims. (Cl. 64—29)

This invention relates to propeller shafts for motor vehicles.

In the construction of motor vehicles considerable attention has been given to the matter of absorbing vibration and deadening sound. Practically every part of the car has been studied with that object in view but, so far as I am aware, there has been no improvement made in the propeller shaft to overcome the objectionable noise due to the resonance of this tubular part which asserts itself at certain critical speeds, nor any improvement with a view to diminishing if not entirely eliminating its susceptibility to transmitting vibrations, created or occurring in either of the mechanisms ahead and behind the propeller shaft. It is, therefore, the principal object of my invention to provide a non-resonant and vibration dampening propeller shaft.

The propeller shaft of my invention is tubular and filled or plugged with a relatively non-resonant material to dampen vibration and prevent harmonics from affecting the shaft so that the phenomenon of resonance is eliminated.

This application is a continuation in part of my copending application Serial No. 615,917, filed June 7, 1932.

In the drawing—

Figure 1 shows a propeller shaft and its universal joint connection, the said shaft being filled with non-resonant material as indicated by the cross-section, Fig. 2;

Fig. 3 is a similar section showing the use of a different non-resonant material, and Fig. 4 is a view corresponding in part to Figure 1 illustrating the use of plugs for a similar purpose.

Similar reference numerals are applied to corresponding parts throughout the views.

Referring first to Figure 1, the propeller shaft is indicated by the reference numeral 10. It is tubular like other propeller shafts and joined at its rear end to the yoke 11 of a universal joint 12 to transmit power to the driven spindle in the rear axle housing of the motor vehicle on which the propeller shaft is mounted. The front end of the shaft carries a splined part 13 received within the slip yoke 14 of the front universal joint 15 so as to make connection with the gear set. The connections at the front and rear may be completed through the conventional coupling flanges 16 and 17, or in any other suitable or preferred manner.

The propeller shaft 10 is subjected to torsional, column or strut, and beam deflections. Being of regular section, it is also subject to natural harmonic resonance. This resonance may be the result of the direct forces, above mentioned, or due to sympathetic harmonic resonance. That is to say, the deflections of an ordinary tubular propeller shaft incident to operation of the motor vehicle are found to cause a distinct noise attributable to the resonance of the part. Then, too, sympathetic vibration of an ordinary tubular propeller shaft causes a distinct noise to be heard at certain critical speeds where such vibration manifests itself. The vibrations which the propeller shaft may fall in with in the way of sympathetic vibrations, may be created or occur either in the rear axle or in any part of the mechanism in front of the propeller shaft, and, of course, some vibrations occurring ahead or behind the propeller shaft may be transmitted directly through the propeller shaft unless the same is properly constructed to dampen out such vibration. An ordinary propeller shaft being of tubular section also has a harmonic vibration by reason of the closed air space.

In accordance with my invention, I prevent harmonics from affecting the shaft either by filling or plugging the same with a relatively non-resonant material to dampen vibration and eliminate the phenomena of resonance. Thus, in Fig. 2, the shaft 10 is shown filled with steel wool 18, which is a relatively non-vibrating material and will accordingly dampen out the vibration of the shaft. Any other suitable material, whether metallic or non-metallic, having similar characteristics so far as deadening vibration is concerned could, of course, be used. Fig. 3 shows a filling 19 of non-metallic material, such as cork, cotton, or plaster Paris, selected because of its vibration dampening characteristics. It is readily conceivable that while I have shown a metallic fibrous material in Figure 1 and a non-metallic solid material in Fig. 3, a combination of these materials might be used to good effect.

In Fig. 4, the shaft 10' corresponds to the shaft 10 without any filling but having plugs 20 of cork or rubber, or any other compressible and slightly resilient material having sound deadening or dampening properties. I prefer the use of composition cork as it seems to be best adapted for the purpose. These plugs are inserted with a press fit and shifted until the proper locations are determined experimentally. Assuming a correct diagnosis of the effect secured with these plugs, they are placed at the points of maximum vibratory motion. Once the proper locations are determined it is, of course, unnecessary to go to the trouble of checking for vibration on subsequent shafts of the same size, the plugs being sufficiently elongated to be certain of spanning the proper points on the shafts to secure the desired results. The fact that the plugs are concentric with the shaft insures against any disturbance of dynamic balance in the turning of the shaft, the same being true, of course, where the shaft is filled. There is, of course, an appreciable saving in fixing shafts this way as compared with filling, and substantially the same results are secured.

It is believed the foregoing description conveys a good understanding of all of the objects and advantages of my invention. The appended claims have been drawn to cover all legitimate modifications and adaptations.

I claim:

1. A hollow propeller shaft for a motor vehicle power transmission train adapted to have suitable power transmitting connections at opposite ends, and a plug of non-resonant material frictionally engaging the inside of the shaft to dampen vibration of the walls thereof.

2. A hollow propeller shaft for a motor vehicle power transmission train adapted to have suitable power transmitting connections at opposite ends, and plugs of substantially non-resonant material frictionally engaging the walls of said shaft at the points of maximum vibratory motion to dampen vibration and render the shaft substantially non-resonant.

3. A hollow propeller shaft for a motor vehicle power transmission train adapted to have suitable power transmitting connections at opposite ends, and a plug of substantially non-resonant material frictionally engaging the inside of the shaft to dampen vibration of the walls thereof, and said plug being sufficiently elongated whereby to span the proper point on the shaft when located by approximation.

4. A hollow propeller shaft for a motor vehicle power transmission train adapted to have suitable power transmitting connections at opposite ends, and plugs of substantially non-resonant material frictionally engaging the walls of said shaft at the points of maximum vibratory motion to dampen vibration and render the shaft substantially non-resonant, and said plugs being sufficiently elongated whereby to span the proper points on the shaft when located by approximation.

5. A propeller shaft as set forth in claim 1 wherein the material is compressible and resilient, the plug having a press fit in the shaft and relying upon its resilience for snug frictional engagement with the walls of the shaft.

6. A propeller shaft as set forth in claim 2 wherein the material is compressible and resilient, the plugs having a press fit in the shaft and relying upon their resilience for snug frictional engagement with the walls of the shaft.

7. A hollow propeller shaft for a motor vehicle power transmission train adapted to have suitable power transmitting connections at opposite ends, and plugs of substantially non-resonant material frictionally engaging the walls if said shaft at the two points of maximum vibratory motion to dampen vibration and render the shaft substantially non-resonant.

8. A hollow propeller shaft for a motor vehicle power transmission train adapted to have suitable power transmitting connections at opposite ends, and plugs of substantially non-resonant material frictionally engaging the walls of said shaft at the two points of maximum vibratory motion to dampen vibration and render the shaft substantially non-resonant, and said plugs being sufficiently elongated whereby to span the proper points on the shaft when located by approximation.

BENJAMIN A. SWENNES.